United States Patent Office 3,097,736
Patented July 16, 1963

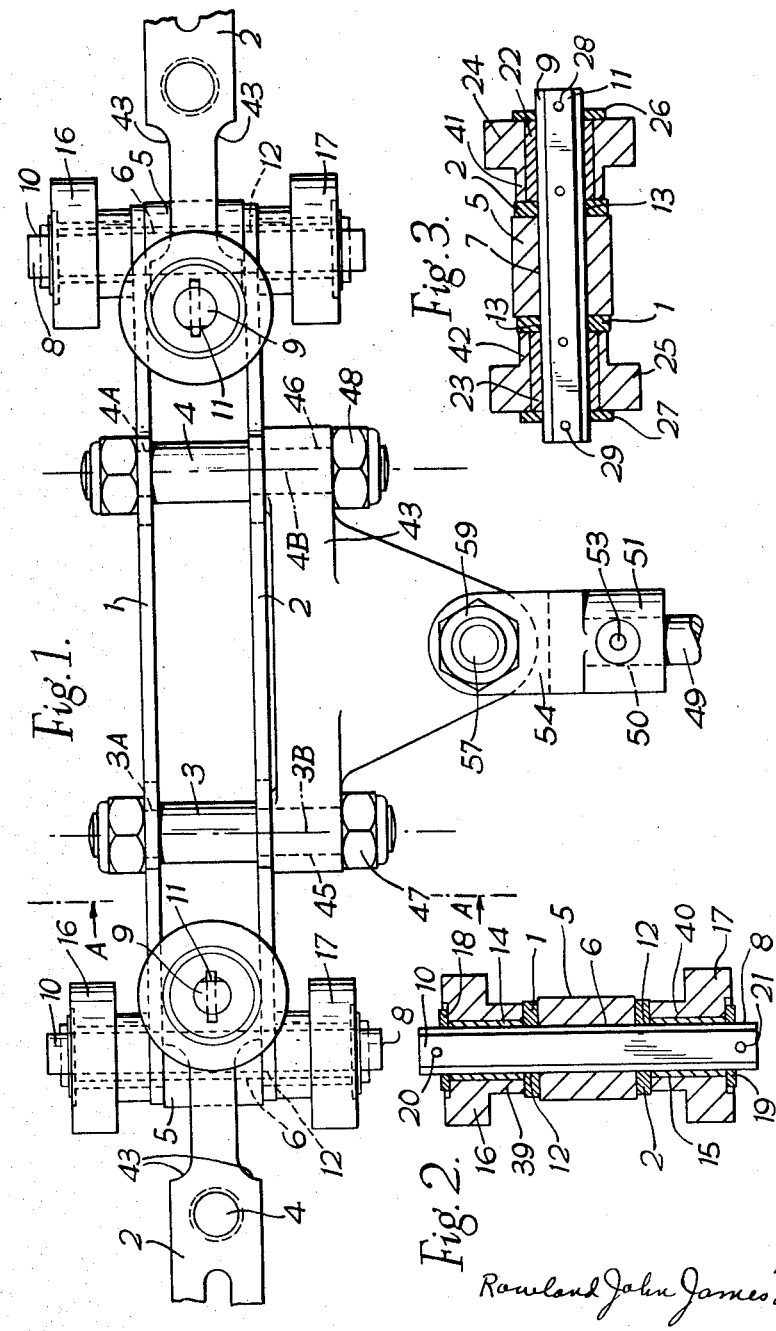

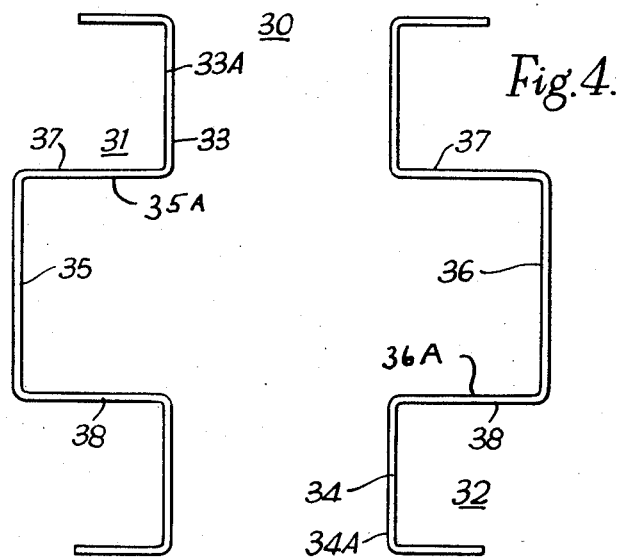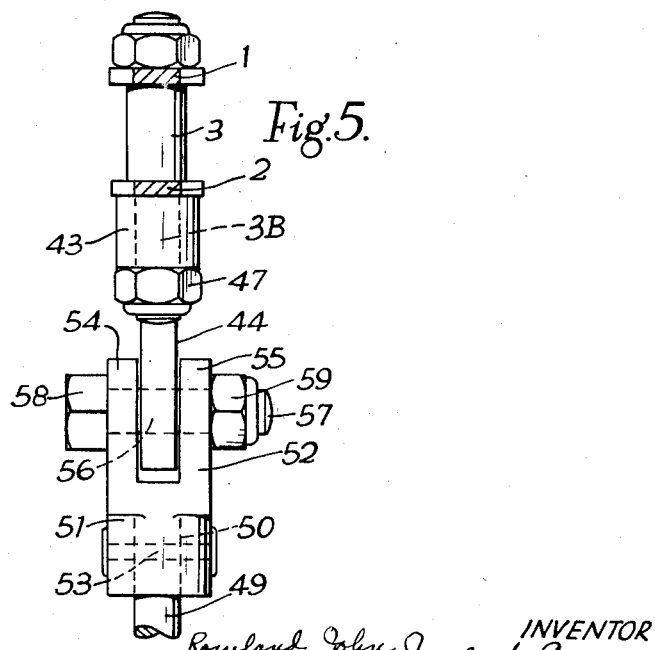

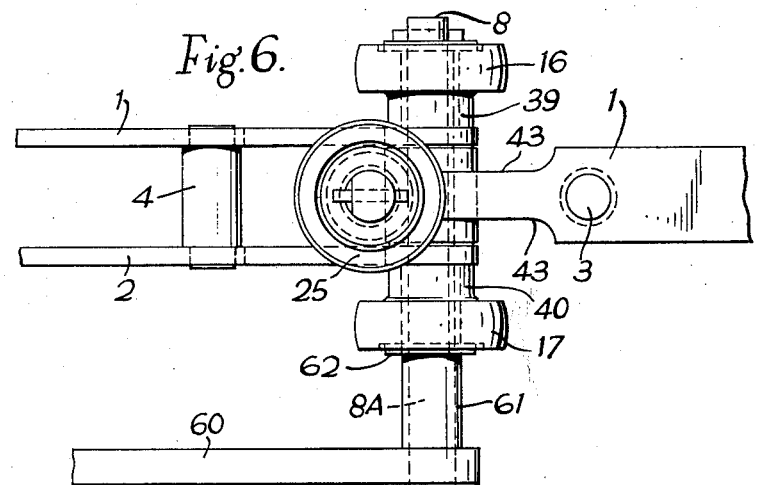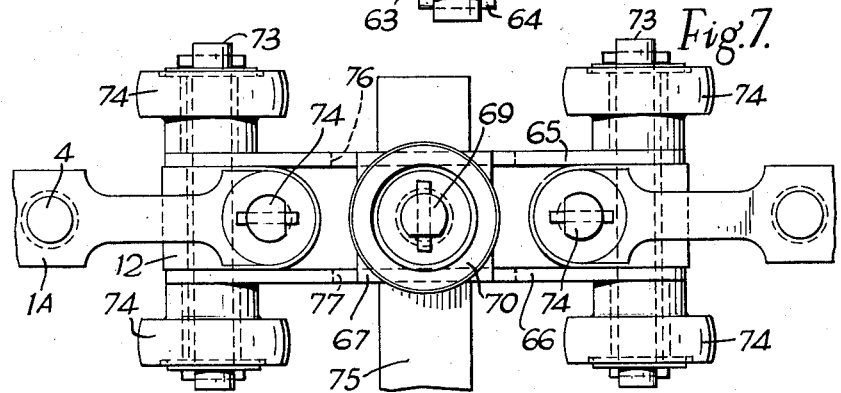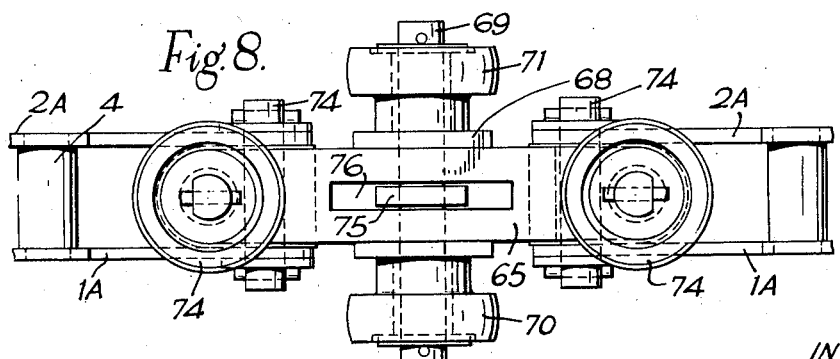

3,097,736
LINK CONVEYOR WITH ARTICLE SUPPORTED HOOK
Rowland John James de Courcy, Loughton, England, assignor to Baker Perkins Inc., Saginaw, Mich., a corporation
Filed Feb. 10, 1961, Ser. No. 88,567
5 Claims. (Cl. 198—177)

This invention relates to chains for chain-operated conveyors.

The invention relates more particularly to such chains of the kind which have links which are connected to one another by means of pivot or articulating members, the two links which are connected by any one pivot member being pivotable relatively to the pivot member about axes which are normal to one another.

The principal object of the present invention is to construct the chain in such a way that when the chain is in tension, the material of each pivot or articulating member (hereinafter called a "pivot member") between the said axes is placed in compression.

A further object of the invention is to provide a chain which will be convenient and reliable in use but which nevertheless will be of relatively cheap and simple construction.

According to the invention, therefore, the invention consists in a chain for chain-operated conveyors, comprising links which are connected to one another at their adjoining ends by pivot members, the two links which are connected by any one pivot member being pivotable relatively to the pivot member about axes which are normal to each other, the arrangement and the disposition of the two associated axles at each end of the link being such that when the chain is in tension the material of pivot member which carries the two axles is placed in compression between the axles.

Each link may comprise two spaced link plates which are retained in spaced relationship by at least two spaced pins, one of which is spaced from one end of the link and the other from the opposite end of the link. The pins on some of the links may constitute driving pins for the chain.

A construction is described hereinafter wherein one of the two axles at each end of a link is turnably arranged in a bearing formed in the pivot member, the other axle being turnably arranged in another bearing which is formed in the pivot member and is normal to the first mentioned bearing. Each axle is fitted in holes near the ends of the link plates constituting a link and means are provided for preventing the axles turning relatively to the link plates.

In the same construction, one axle of the two axles carried by each pivot member projects at each end through the link plates constituting a link and the other of the two axles, which is normal to the first mentioned axle and is carried by the pivot member, projects at each end through link plates constituting the adjoining link. A guide wheel is turnably arranged on each projecting end of each axle and the guide wheels are adapted to run in guides provided by a guide track.

The pivot members may be made of a material of low tensile strength and it has been found that nylon is an excellent material of this nature. It is also preferred to make the guide wheels, or at least some of them, of nylon.

The chain may comprise a number of load-carrying attachments and each load-carrying attachment may comprise a bracket which is fixed on extensions of two adjoining link plates spacing pins and support a load-carrying bar.

As an alternative, however, each load-carrying member attachment may comprise a reinforcing or load carrying bar which is disposed below a chain link and is secured to extensions of the two vertical axles arranged at opposite ends of the link.

A modified chain is made up of a number of shorter links alternating with longer links, each shorter link comprising two link plates and two pivot members arranged between the link plates near the opposite ends of the link. Each pivot member is provided with a bearing for a vertical axle which is turnable in the bearing and with a bore carrying a pivot pin upon which the ends of the link plates of the adjoining longer link are mounted. A horizontal axle is carried by the link plates of the shorter link between the vertical axles and guide wheels are arranged on extensions of all the axles. This modified construction may comprise a load-carrying bar which is pivotally suspended from the horizontal axle between the link plates.

Constructional forms of the invention are shown, by way of example, in the accompanying drawings, in which:

FIG. 1 is an elevation of one form of chain and shows a complete link and portions of the ends of two adjoining links;

FIG. 2 is a section through the vertical axle;

FIG. 3 is a section through the horizontal axle;

FIG. 4 is a section through the track in which the vertical and horizontal guide wheels are guided during the running of the conveyor;

FIG. 5 is a section on the line A—A in FIG. 1;

FIG. 6 is an elevation of part of a modified form of conveyor which is provided with reinforcing or load bars, the ends of each of which are connected to extensions of vertical axles carried by the two link plates;

FIG. 7 is an elevation of another modified conveyor which comprises a number of shorter links alternating with longer links; and FIG. 8 is a plan view corresponding to FIG. 7.

Referring first to FIGS. 1 to 5:

The conveyor chain, which, for the purpose of the present description will be assumed to be horizontal, is made up of successive metal links, each of which is made up of link plates 1 and 2 which are rigidly connected together by means of two transverse spacing pins 3 and 4 which are spaced from one another along the length of the link-plates, each being spaced somewhat from the corresponding end of the link-plates.

The pivotal connection between successive links is effected by a trolley block 5 having a vertical, spaced bore 6 and a horizontal bore 7 which extend through the block and are normal to each other and are fitted respectively with axles 8 and 9. The axles are formed over at least a part of their lengths respectively with flats 10 and 11 and the link-plates are non-rotatably engaged with the axles, each link-plate being formed, for this purpose, with holes 12 and 13 near its ends, which holes are appropriately shaped for engagement with the flattened cross-sections of the axles. The bores 6 and 7 extend at right angles between opposite parallel faces of the block. Thus, the holes 12 and 13 in the link-plates of two successive links can be engaged on the respective axles 8 and 9, with the link-plates 1 and 2 of the two links in sliding contact with the respective pairs of parallel faces of the block. It will be understood therefore, that the dimensions of the block 5 are determined by the length of the transverse pins 3 and 4.

During the assembly of the chain, the block 5 is engaged between the end-portions of the link-plates 1 and 2 of both the associated pairs in such a position that the holes in the link plates of either pair register with the bore furthest from the remote ends of the plates. Thus, when the axles have been engaged in the block, the link-plates of one pair have the axle corresponding to the other pair extending between them in a direction parallel to the planes thereof.

Accordingly, when the chain is in tension the material of the block 5 between the two bores 6 and 7 is placed in compression and this makes it possible to make the block of a material of low tensile strength. The preferred material for this purpose is nylon which has been found to present a relatively small amount of friction both at the surfaces of the block where it is in sliding contact with the link-plates and at the wall of the bores 6 and 7 where it is in contact with the axles. Thus lubrication is unnecessary.

The portions of the vertical axle 8 which project beyond the top and bottom faces of the block 5 carry above and below the corresponding link-plates cylindrical sleeves or ferrules 14 and 15, upon which are mounted freely rotatable wheels 16 and 17. The end-portions of the axles project only small amounts from the wheels and they carry, beyond the wheel, metal washers 18 and 19 which bear against the ends of the cylindrical sleeves 14 and 15 and are retained in place by means of resilient fixing pins 20 and 21 passing through transverse bores in the axle.

Similarly, the portions of the horizontal axle 9 which project beyond the side faces of the block 5 carry laterally of the corresponding link-plates cylindrical sleeves or ferrules 22 and 23 upon which are mounted freely rotatable wheels 24 and 25. The end portions of the axles carry beyond the wheels metal washers 26 and 27 which bear against the ends of the ferrules 22 and 23 and are retained in place by means of resilient fixing pins 28 and 29 passing through transverse bores in the axle.

Usually the chain is employed in such a position that one axle in a trolley block 5 is horizontal while the other is vertical. The wheels carried by the axles serve to guide and support the chain during its conveying movement, by engagement with a track 30, FIG. 4, comprising two glide elements or rails 31 and 32 constituted by two upright plates 33 and 34 spaced from one another. For the purposes of engagement with the wheels 24 and 25 which are rotatable about the horizontal axles 9, the plates are deformed outwardly at 35A and 36A to provide recesses 35 and 36 extending longitudinally thereof. The width of these recesses is such that the deformed plate-portions 35A and 36A providing the upper and lower walls 37 and 38 thereof constitute upper and lower running surfaces engaging at opposite sides of the corresponding guide wheels 24 and 25. The spacing between the plates is such that the undeformed plate-portions 33A and 34A above and below the recesses respectively, engage at opposite sides of the guide-wheels 16 and 17 which are rotatable about the vertical axles 8. With this arrangement the chain is constrained to follow the vertical and horizontal deviations of the track.

The guide wheels 16, 17, 24 and 25 respectively have central bosses 39, 40, 41 and 42 extending inwardly along their axles. The overall width of each wheel and its boss, however, is only slightly less than the distance between the link-plate and the retaining washers 18, 19, 26 or 27, so that the lateral play of each wheel on its axle is limited.

The angle through which successive pairs of link-plates 1 and 2 can pivot relatively to one another without fouling the guide wheels 16, 17, 24 and 25 should be as great as possible. Thus, diameter of the bosses 39, 40, 41 and 42 of the wheels is smaller than the spacing between the link-plates. In addition, the edges of the parts of the length of each link-plate between the respective spacing pins 3 and 4 and the adjacent apertured end-portions are recessed at 43, so that each link-plate has a portion of reduced width at each of the two parts of its length where it would come into contact with the guide-wheels if unlimited pivoting movement were permitted.

On account of the good anti-frictional properties of nylon, already referred to, it has been found convenient to make the guide-wheels of this material. However, in place of guide-wheels directly mounted for rotation about the axles, it is possible to employ guide wheels mounted on the axles by means of ball-bearings.

In use, a chain as described above can conveniently be driven, either from above or from below, by means of a so-called "caterpillar" drive, that is to say, by means of dogs which, during their movement, engage with the pins 3 and 4 of alternate links wherein the pins are horizontal so as to feed the chain forwards. For this purpose the pins 3 and 4 are, of course, accessible by way of the gap between the upper or lower edges of the guide-rails 31 and 32. The chain may also be driven from the side by conventional means such, for example, as toothed wheels or sprockets.

Load carrying attachments for carrying suspended loads are provided on as many links as may be required. Referring to FIGS. 1 and 5, the pins 3 and 4 are provided with reduced upper end parts 3A and 4A which project upwardly through holes in the link plate 1 and reduced lower end parts 3B and 4B which project downwardly through holes in the link plate 2. The base 43 of a bracket 44 is provided with spaced holes 45 and 46 through which the ends 3B and 4B of the pins 3 and 4 are passed, the bracket being held on to the link plate 2 by means of nuts 47 and 48 which are screwed upon the threaded ends of the pin ends 3B and 4B. The upper end of a load-supporting bar 49 is fitted in a hole 50 formed transversely in the boss part 51 of a fork 52 by means of a pin 53. The fork is formed with two limbs 54 and 55 which are fitted on opposite sides of the bracket 44 and are pivotally mounted on the shank 56 of a bolt 57 the head 58 of which bears against the limb 54 of the fork. The shank of the bolt passes through holes formed coaxially in the limb 54, the bracket 44 and the limb 55 and axial movement of the bolt is prevented by a nut 59 screwed upon the threaded end of the shank of the bolt.

It may sometimes be desirable to reinforce the chain by means of connecting bars between pairs of joints, additional to the link-plates. The load exerted by the goods being conveyed may then be applied to these connecting bars.

Thus, referring to FIG. 6, when a chain such as that which has been described above is used in the construction of an overhead conveyor, in which the goods being conveyed are carried on suspended platforms, the vertical axles 8 on the chain are of such a length that their lower ends 8A project below the lower edges of the guide-rails 31 and 32, FIG. 4. Each load bar 60 extends along the length of one of the links, the link-plates 1 and 2 of which are journalled on two vertical axles 8, associated with the link, the bars being apertured near their ends for engagement on the projecting axle-portions 8A. Each axle-portion 8A carries a tubular spacer 61 by means of which the bar 60 is spaced from the wheel 17 carried by the same axle-portion. The spacer 61 bears against the wheel through the intermediary of a washer 62 and the whole assembly is retained in position by a further washer 63 and a transverse resilient pin 64 provided below the bar 60. Each goods-supporting platform (not shown) is suspended from one such bar 60.

In a modified form of chain, shown in FIGS. 7 and 8, the link-plates are not all alike. Instead, the chain comprises pairs of relatively long link-plates 1A and 2A, spaced apart by means of spacing pins in the manner referred to above, alternating with pairs of shorter link-plates 65 and 66. The link-plates of each of these latter pairs are secured together by two cross-pieces 67 and 68 welded to the edge of the link-plates at a central position along the length thereof.

An axle 69 which extends transversely of each pair of shorter link-plates and is formed with a flat as described above, is engaged in correspondingly-shaped holes formed in the cross-pieces 67 and 68. Each such axle carries two wheels 70 and 71 outside the two link-plates, each wheel being mounted on the corresponding end portion of the axle in a manner similar to that described above.

At their ends, the shorter link-plates 65 and 67 are connected to the adjoining pair of longer link-plates by means of nylon blocks 72 similar to those previously described. However, in this construction, only the two vertical axles 73 passing through each block carry wheels 74. The other axle 74a which is fitted in the block 72 and which is parallel to the axle 69 serves only for effecting connection of the adjoining longer link-plates to the nylon block.

Thus, whereas in the chains described above with reference to FIGS. 1 to 6, the nylon blocks carry two sets of pairs of guide-wheels with equal numbers of pairs in the two sets, in the modified form of chain shown in FIGS. 7 and 8 the guide-wheels of one set are carried by alternate links of the chain instead of by the blocks and this set comprises only one pair of guide-wheels for each two pairs of the other set.

The load exerted on a chain of this modified form can conveniently be applied by way of the axles 69 carried by the cross-pieces 67 and 68. Thus, in the construction of an overhead conveyor, for example, the chain is arranged to run in a guide track such as that previously referred to, with the axles 69 extending horizontally. Each axle 69 has a bar 75 turnably mounted at a central position thereon, the two link-plates 65 and 66 supporting the axle being slotted at 76 and 77 at corresponding positions to accommodate the bar and to allow it to swing to and fro, as may be necessary. While one end of the bar 75 projects only a short distance through the slot 76 in the upper link-plate 65, the other end of the bar extends a substantial distance downwardly through the slot 77 in the lower link-plate 66 and between the lower edges of the rails 31 and 32 of the guide-track. A goods-supporting platform (not shown) is mounted at the lower end of each bar 75.

I claim:

1. A chain comprising a pivot member having a first pivotal axis and a second pivotal axis substantially normal to and linearly spaced from said first axis; a first pair of spaced apart links; a second pair of spaced apart links normal to and partially overlapping the said first pair of links, the links of said first pair of links having their corresponding ends terminating adjacent said first axis and extending toward and beyond said second axis, the links of said second pair of links having their corresponding ends terminating adjacent said second axis and extending toward and beyond said first axis; means connecting the corresponding ends of said first pair of links to said first pivotal axis; and means connecting the corresponding ends of said second pair of links to said second pivotal axis, whereby tensioning of said pairs of links stresses said pivot member in compression.

2. The construction set forth in claim 1 wherein said pivot member is formed of material having a lower tensile strength than said links.

3. The construction set forth in claim 2 wherein said pivot member is formed of nylon.

4. The construction set forth in claim 1 wherein said connecting means comprise pins extending through said pivot member and through said pairs of links.

5. The construction set forth in claim 4 wherein said pins are rotatably mounted in said pivot member and non-rotatably mounted in said links.

References Cited in the file of this patent

UNITED STATES PATENTS

| | | |
|---|---|---|
| 2,526,563 | Keen | Oct. 17, 1950 |
| 2,640,585 | Onwin | June 2, 1953 |
| 2,816,453 | Frank et al. | Dec. 17, 1957 |

FOREIGN PATENTS

| | | |
|---|---|---|
| 723,734 | Great Britain | Feb. 9, 1955 |

OTHER REFERENCES

Du Pont Prod. Engr. Bulletin, vol. or Series 2 of 1955, May 1955.